J. D. KIRBY.
JOINT FOR TUBULAR SECTIONS.
APPLICATION FILED JULY 18, 1910.

993,304.

Patented May 23, 1911.

WITNESSES:
Herbert L. Kelley
E. D. Ogden

INVENTOR
James D. Kirby.
BY
Howard E Barlow
ATTORNEY

UNITED STATES PATENT OFFICE.

JAMES D. KIRBY, OF NORTH ATTLEBORO, MASSACHUSETTS, ASSIGNOR TO HANLON-THORNTON COMPANY, OF NORTH ATTLEBORO, MASSACHUSETTS, A CORPORATION OF MASSACHUSETTS.

JOINT FOR TUBULAR SECTIONS.

993,304. Specification of Letters Patent. Patented May 23, 1911.

Application filed July 18, 1910. Serial No. 572,597.

*To all whom it may concern:*

Be it known that I, JAMES D. KIRBY, a citizen of the United States, residing at North Attleboro, in the county of Bristol and State of Massachusetts, have invented certain new and useful Improvements in Joints for Tubular Sections, of which the following is a specification, reference being had therein to the accompanying drawing.

This invention relates to hinge joints for tubular sections, and has for its object to provide a hinge adapted to fit into and be concealed in the abutting ends of tubular sections, the joint comprising two hinged members each formed of stock doubled or folded upon itself, one of said members being provided with pivots and the opposite member with eyes, the latter member being adapted to fold over the former causing the pivots to enter said eyes thereby forming a complete joint between them.

With these and other objects in view, the invention consists of certain novel features of construction, as will be more fully described and particularly pointed out in the appended claims.

Figure 1:
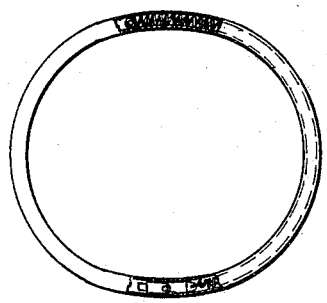
Figure 2:
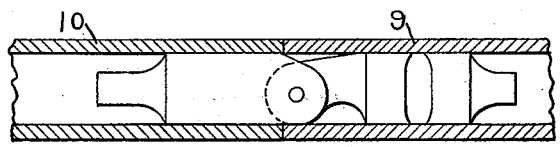
Figure 3:
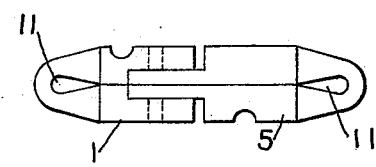
Figure 5:
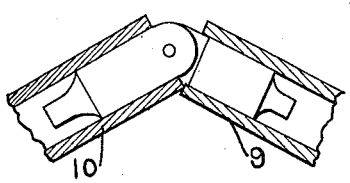
Figure 4:
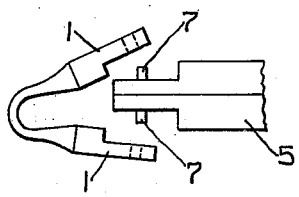
Figure 6:
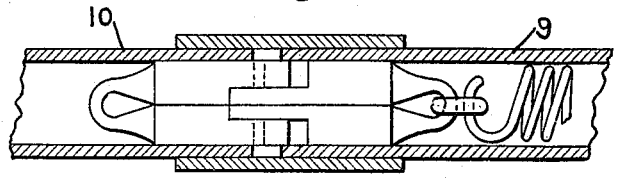
Figure 7:
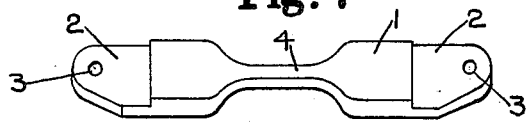
Figure 8:
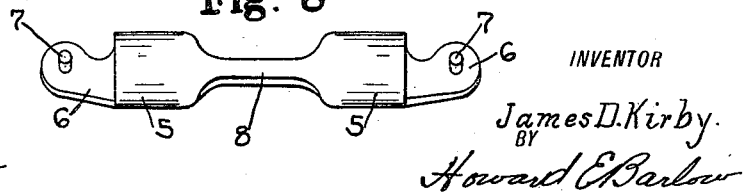

In the accompanying drawings: Figure 1— is a side elevation of one form of tubular bracelet, partly in section, showing my improved joint mounted therein. Fig. 2— is an enlarged sectional side view of abutting tubular sections showing my joint members mounted therein. Fig. 3— is a top view of the joint members. Fig. 4— illustrates the joint member with the eyes being closed over the pivots on the opposite member. Fig. 5— illustrates a tubular joint with the members at an angle with each other. Fig. 6— illustrates the joint members applied to abutting tubular sections, with a ferrule adapted to slide over and support the jointed members in their extended position. Fig. 7— is an enlarged detail of one of the joint members as extended and formed by the die. Fig. 8— is a detail of the opposite joint member extended and as blanked from the stock.

A feature of my improved joint members is that they are preferably constructed of comparatively soft metal so that each may be struck up and formed complete in a die with but a single operation. The body portion of these members may be formed cylindrical, square, oblong or other desired shape to correspond with and fit into the tubular sections which they are designed to connect. Each of these members is formed substantially double the length possessed when completed and assembled, the stock being then folded upon itself, bringing the ends evenly together. One member 1 is formed with recessed portions 2 at its ends. Pivot holes 3—3 are punched through the stock at these recessed portions. The ends of the other hinge member 5 are reduced in thickness, as at 6. Extending from these reduced portions and preferably formed integral therewith are pivot lugs 7—7 which lugs when the member is folded or doubled are in axial alinement and extend in opposite directions. The middle portions of these members, 4 and 8, respectively may be reduced if desired to facilitate the folding operation, and also to facilitate in some cases the fastening of a spring, or other device thereto by passing a loop around this reduced portion.

In assembling, the member 5 is first folded upon itself, the member 1 is then folded upon itself and its eyes 3—3 closed over the pivot lugs 7—7 in the manner illustrated in Fig. 4, thereby providing a finished joint, as shown in Fig. 3, each member of the joint being adapted to be inserted in the opposite abutting ends of the tubular sections 9 and 10.

In some instances, for example in some styles of bracelet, it is found convenient to attach a spring to the reduced middle portion of one or both of the jointed members as illustrated in Fig. 1 of the drawing, the spring being used, if desired, to facilitate the closing of the bracelet. This reduced portion when used for this purpose may be bent in the form of an eye 11—11 as illustrated in Fig. 3.

By comparing Figs. 7 and 8 which show the two joint members before they have been bent or folded, with Figs. 3, 4 and 6, it will be seen that each strip, after it has been folded to the position indicated in Figs. 3 and 6, has contacting inner faces between its loop or eye portion and its pivotal end. Also that the outer faces of each member after it is folded, are parallel. Therefore the two members can be fitted tightly in the tubes which are to be joined, the outer parallel faces of the members fitting the tubes and remaining in fitted condition because each member has contacting inner faces which absolutely prevent any further reduction of its closed sectional area.

I do not wish to be restricted to bracelets in the use of my improved joint as said joint may be used for joining any other tubular sections. Nor do I wish to be restricted to the reducing of the middle section of each member, as the sections may be constructed with the whole body of a uniform size, if desired. Neither do I wish to be restricted to the formation of the pivot lugs integral with the member 5.

I do not restrict myself to any particular means for retaining the joint members in the tubing as they may be forced therein and be held by friction, or they may be soldered or be held by any convenient means.

I claim:

1. In a bracelet, the combination with two tubular members of a hinge joint comprising two hinge members each formed of a body folded at midlength, the said folded body being secured within its respective tubular member and conforming to the inner contour of the latter, and means for pivotally connecting the ends of said bodies at the junction of said tubular members.

2. In a bracelet, the combination with two tubular members, of a hinge joint comprising two hinge members each formed of a body folded at midlength, the said folded body being secured within its respective tubular member and conforming to the inner contour of the latter, one of said members being provided with integral pivot lugs, the other member being provided with complemental recesses receiving said lugs, whereby said members are pivotally connected at the junction of said tubular members.

3. A hinge joint for bracelets comprising a hinge member having a recess in one end, a second hinge member formed of a body provided with a flat face and folded at midlength with the opposite portions of said flat face in contact with each other, the ends of said body extending into the said recess, and means for pivotally connecting the first member in the recess of the second member.

4. A hinge joint for bracelets comprising a hinge member having a recess in one end, a second hinge member formed of a body provided with a flat face and folded at midlength with the opposite portions of said flat face in contact with each other, the ends of said body extending into the said recess, said ends being provided with integral pivot lugs struck up from said body, the sides of the recess of the first member being closed over the ends of the first member and provided with apertures to receive said lugs.

In testimony whereof I affix my signature in presence of two witnesses.

JAMES D. KIRBY.

Witnesses:
HOWARD E. BARLOW,
G. CROSSLEY.

---

Copies of this patent may be obtained for five cents each, by addressing the "Commissioner of Patents, Washington, D. C."